UNITED STATES PATENT OFFICE.

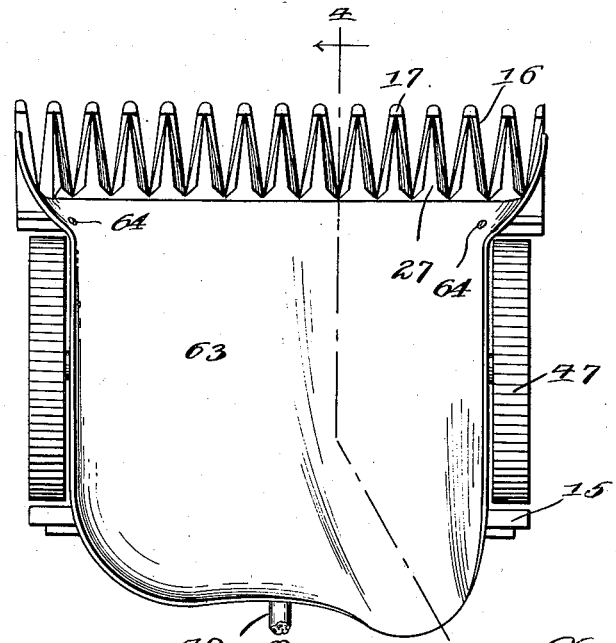
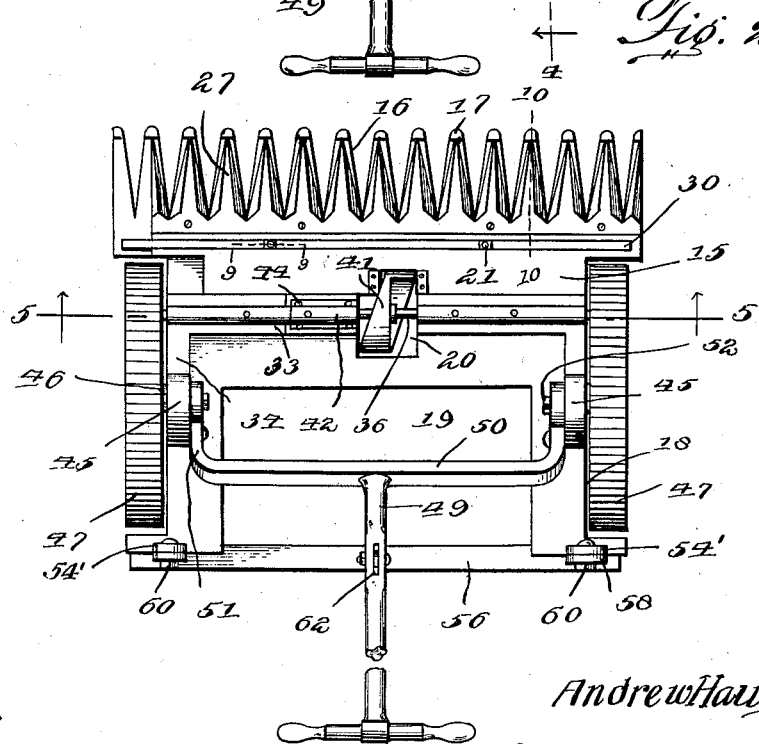

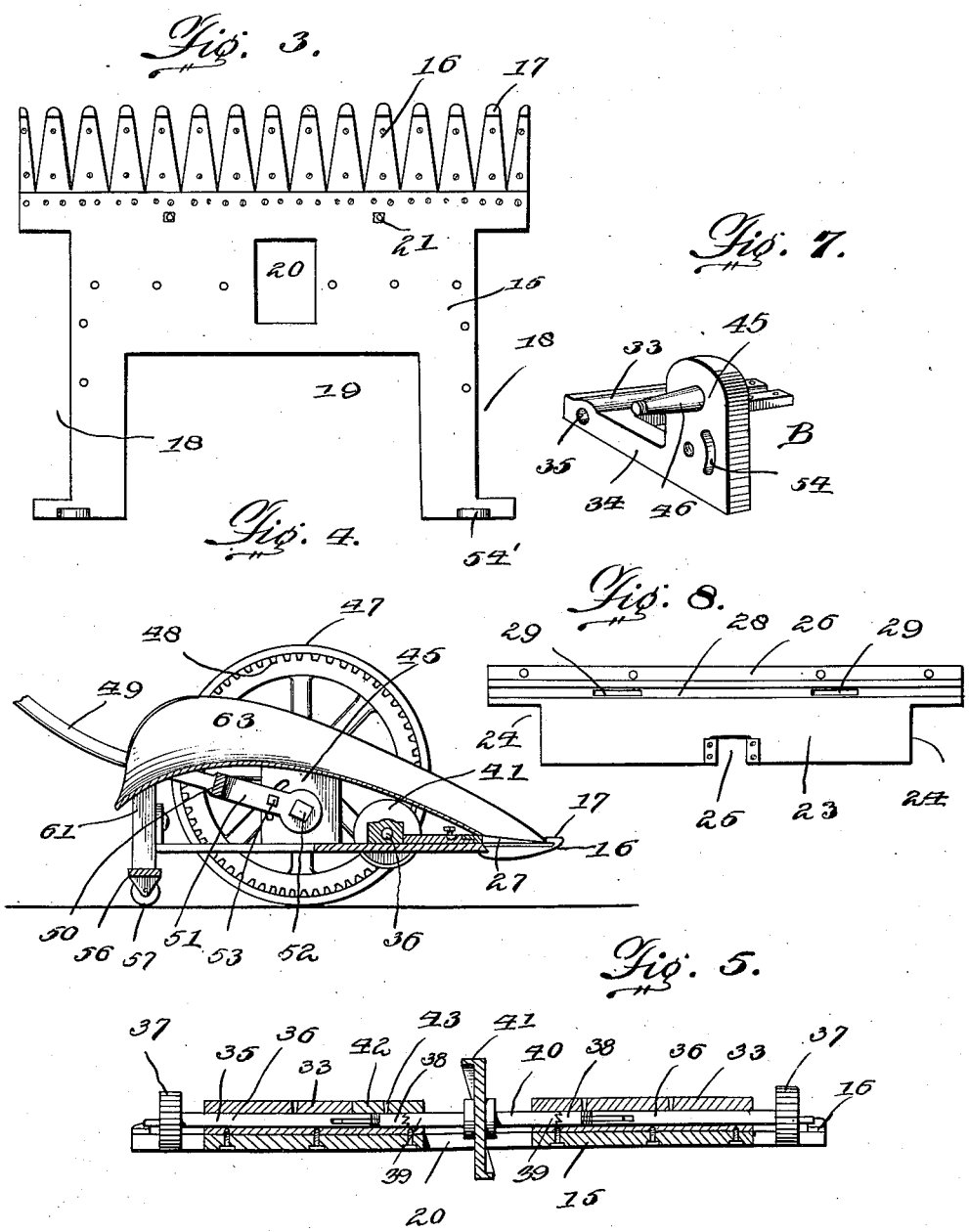

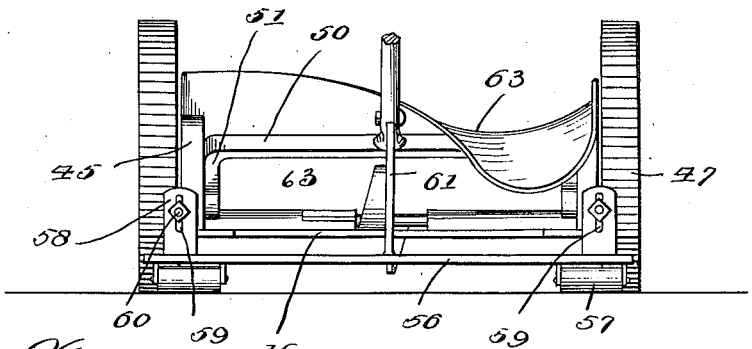
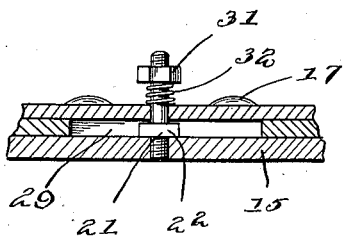
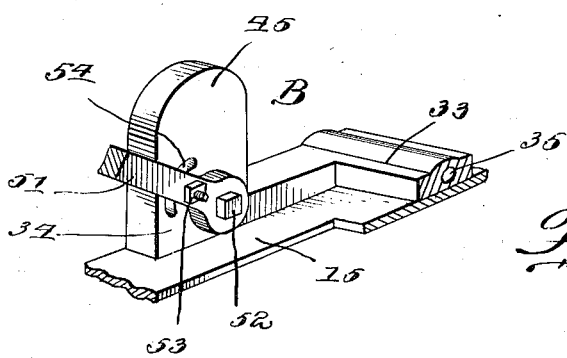
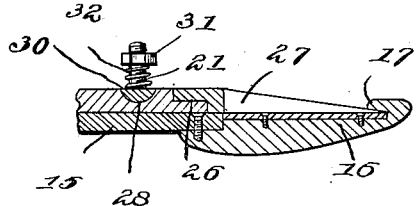

ANDREW HAUGLAND, OF SIOUX CITY, IOWA.

LAWN-MOWER.

1,139,180.  Specification of Letters Patent.  Patented May 11, 1915.

Application filed December 31, 1913. Serial No. 809,778.

*To all whom it may concern:*

Be it known that I, ANDREW HAUGLAND, a subject of the King of Norway, residing at Sioux City, in the county of Woodbury and State of Iowa, have invented new and useful Improvements in Lawn-Mowers, of which the following is a specification.

This invention relates to lawn mowers, and it has particular reference to that class of lawn mowers which are equipped with a reciprocatory cutter bar.

One object of the invention is to produce a lawn mower of the character described having a top plate or cap plate which receives the cut grass and which is shaped somewhat like the mold board of a plow so that the cut grass will pass over said cap plate and be discharged to one side for convenience in subsequent gathering, thereby avoiding the necessity for raking a large proportion of the lawn and the consequent danger of uprooting and destroying the grass.

A further object of the invention is to simplify and improve the general construction of the mower and the manner of assembling the same, making the parts readily accessible for sharpening or repairs.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited but that changes, alterations and modifications within the scope of the claims may be resorted to when desired.

In the drawings, Figure 1 is a top plan view of a lawn mower constructed in accordance with the invention. Fig. 2 is a top plan view of the same with the cap plate removed. Fig. 3 is a top plan view of the base plate of the mower. Fig. 4 is a longitudinal vertical sectional view taken on the line 4—4 in Fig. 1. Fig. 5 is a transverse sectional view taken on the line 5—5 in Fig. 2. Fig. 6 is a rear elevation, the handle being shown in section. Fig. 7 is a perspective detail view of one of the bracket members supporting the main shaft and the ground wheels. Fig. 8 is a detail plan view of the reciprocatory cutter bar detached. Fig. 9 is a sectional detail view, enlarged, taken on the line 9—9 in Fig. 2. Fig. 10 is a sectional detail view, enlarged, taken on the line 10—10 in Fig. 2. Fig. 11 is a perspective detail view illustrating a portion of the handle bar and the means for connecting the same with the mower.

Corresponding parts in the several figures are denoted by like characters of reference.

In the construction of the improved lawn mower there is employed a base plate 15 which consists of a casting of substantially rectangular outline, being provided at the front edge thereof with forwardly extending fingers 16 which are spaced apart by V-shaped recesses, said fingers being provided at their forward ends with guards 17. The base plate is provided with recesses 18 at the side edges thereof to accommodate the ground wheels of the mower, and said base plate has at its rear edge a deep recess 19 to lighten the construction and to afford room for the handle. The base plate is also provided with a slot 20 disposed midway between its side edges for the reception of a cam wheel whereby the reciprocatory bar is actuated, as will be hereinafter described. The base plate is finally provided with suitably disposed apertures for the passage of fastening members, whereby the parts of the device are assembled.

Threaded into the base plate in rear of the fingers 16 are screw bolts 21, each having a rectangular collar 22 that abuts on the top face of the base plate for the purpose of guiding the cutter bar. The latter includes a rectangular bar 23 provided at the ends thereof with recesses 24 for the purpose of clearing the ground wheels and having in its rear edge intermediate the ends thereof a recess 25 to be engaged by the actuating cam wheel. The front edge of the bar 23 has a recess 26 forming a seat for the cutters 27 which are bolted or otherwise secured upon the seat. In rear of the seat 26 the bar 23 is provided with a groove 28 of semi-circular cross section and with slots 29 extending from the bottom of said groove to engage the guide members 22. The groove 28 is for the reception of a guide bar 30 of semi-circular cross section which is apertured for the passage of the upper extremities of the screw bolts 21, the parts being assembled by means of nuts 31 between which and the guide bar 30 springs 32 are interposed, thereby enabling the pressure of the guide bar against the cutter bar to be regulated so as to avoid undue friction between the cutter bar and the face of the base plate whereon it is supported for reciprocation.

It will be obvious that when the parts are assembled, as shown and described, the cutter bar, including the bar 23 and the cutters 27, is free to reciprocate laterally, the teeth being guided over the fingers 16 and beneath the guards 17, the side edges of the fingers coöperating with the cutters to produce a shearing action on the grass.

Mounted on the base plate 15 adjacent to each of the side recesses 18 is an angular or L-shaped block or member B, each of said blocks comprising arms 33, 34, the former of which is disposed in parallel relation to the cutter bar, while the arm 34 is disposed at right angles thereto. The front edges of the arms 33 have been shown as abutting on the rear edge of the cutter bar so as to assist in guiding the latter. The arms 33 are provided with longitudinal bores 35 affording bearings for shaft members 36, each carrying at its outer end a pinion 37. The shaft members 36 are equipped at their inner ends with spring actuated clutch members 38 engaging clutch members 39 on an intermediate shaft member 40 carrying a cam wheel 41 which is accommodated in the slot 20, and which engages the recess 25 of the cutter bar. The clutch members 30, 39 are so contrived that when the shaft members 36 are rotated in one direction the shaft member 40 carrying the cam wheel 41 will be rotated, while when the shaft members 36 are rotated in the opposite direction, the shaft member 40 with the cam wheel 41 will remain idle, the latter being when the machine is moved rearwardly on its supporting wheels which are yet to be described. The arm 33 of one of the angular blocks B has a recess wherein is fitted a detachable box member 42 having an oil aperture 43, said box member being secured by means of screws 44 enabling said box member to be readily detached for the purpose of assembling the parts of the machine which have just been described.

The arm 34 of each block B includes an upwardly extending plate 45 carrying a spindle or journal 46 on which the ground wheels 47 are supported for rotation, said ground wheels being provided with internal gears 48 meshing with the pinions 37 for the purpose of imparting rotary motion to the shaft members 36. The ground wheels are accommodated in the recesses 18 of the base plate, thus providing a construction whereby a cutting mechanism of great width may be employed, the ground wheels traveling on that part of the ground from which the grass has been cut. The plates 45 also serve for the attachment of the handle 49 which has a yoke 50 the limbs of which, 51, are connected with the plates 45 by pivot members 52 extending through the ends of the limbs. Said limbs are also provided at a distance from their terminals with transverse clamp bolts 53 that extend through arcuate slots 54 in the plates 45, thereby enabling the yoke carrying the handle to be adjusted to various angles with respect to the base plate. Mounted on the base plate adjacent to the rear edge and at either side thereof is a block or lug 54'.

56 is a gage bar having ground engaging rollers 57 and upwardly extending lugs 58 provided with slots 59 for the passage of connecting members, such as bolts 60, whereby the gage member may be adjustably connected with the blocks or lugs 54'. The gage member is also provided with a guide finger 61 extending upwardly therefrom intermediate the ends thereof through a slot 62 in the handle 49.

A top plate or cap plate 63 is provided which is detachably mounted or supported above the base plate and resting on the upwardly extending side plates 45 of the supporting members B in such a manner as to cover and protect the working parts of the machine, said top plate being of such dimensions as to extend the entire length as well as the entire width of the base plate so as to afford complete protection for all working parts mounted thereon. Fastening members such as screws 64 are employed to connect the top plate 63 with subjacent parts. Said top plate is curved to somewhat resemble the mold board of a plow and in such a fashion that the grass severed by the cutting apparatus and carried rearwardly over said top plate will be discharged laterally at the rear of the machine and to one side of the longitudinal medial line.

From the foregoing description, taken in connection with the drawings hereto annexed, the operation and advantages of this invention will be readily understood by those skilled in the art to which it appertains.

It will be seen that I have produced a lawn mower of simple and compact construction which may be manufactured at a moderate expense and which may be easily assembled or disassembled for repairs and sharpening. The machine is readily adjusted to overcome undue friction between the base plate and the cutter bar and to arrange the handle as well as the gage member in the most advantageous position for operation, said machine being in every respect convenient and efficient for the purposes for which it is provided.

Having thus described the invention, what is claimed as new, is:—

1. In a lawn mower, a base plate having forwardly extending fingers, recesses at the sides of said plate and a slot in the plate intermediate the recesses, a cutter bar mounted for transverse reciprocatory movement on the base plate and having a notch in its rear side, angular supporting members mounted on the base plate, one at each side, said supporting members having front arms extending in the direction of the slot in the base plate and rearwardly extending arms adjacent to the recesses in the side edges thereof, said front arms having longitudinal bores and said rearwardly extending arms having upwardly extending plates, ground wheels journaled on the plates within the recesses in the side edges of the base plate and having internal gears, shaft members journaled in the bores of the front arms, said shaft members being provided at their outer ends with pinions engaging the internal gears and at their inner ends with spring actuated clutch members, a shaft extending across the slot in the base plate and supported terminally in the bores, said shaft having clutch members engaging the spring actuated clutch members, and a cam wheel on said shaft, said cam wheel being accommodated within the slot in the base plate in engagement with the notch in the cutter bar.

2. In a lawn mower, a base plate having a slot, angular supporting members mounted on the base plate and having front arms and upwardly extending side plates, said front arms being longitudinally bored, journals extending from the side plates, ground wheels mounted on the journals and having internal gears, shaft members journaled in the bore of the front arms and having pinions meshing with the internal gears, a shaft supported in the inner ends of the bores and extending across the slot in the base plate, clutch means connecting the shaft with the aforesaid shaft members, a reciprocatory cutter bar mounted on the base plate, and cutter bar actuating means mounted on the shaft which extends across the slot, said means being accommodated within the slot.

3. In a lawn mower, a base plate, a cutter bar supported thereon for reciprocatory movement, angular supporting members mounted on the base plate, each including a front arm abutting on the cutter bar to assist in guiding the latter, and an upwardly extending side plate having a journal, ground wheels mounted on the journals, means for transmitting motion from the ground wheels to the cutter bar, a handle supporting yoke having limbs terminally pivoted on the side plates, and clamp bolts connected with the limbs of the yoke and extending through the side plates, the latter being provided with arcuate slots for the passage of said clamp plates.

4. In a lawn mower, a base plate, angular supporting members mounted thereon and including front arms having longitudinal bores, one of said front arms being provided with a recess, a half box fitted in the recess, a shaft supported for rotation in the bores of the arms and having terminal clutch members, shaft members supported for rotation in the bores of the arms and having spring actuated clutch members, means for driving the shaft members to impart rotary motion to the shaft, a reciprocatory cutter bar, and means associated with the clutch driven shaft for imparting motion to the cutter bar.

5. In a lawn mower, a base plate having forwardly extending fingers, angular supporting members mounted on the base plate and including front arms having bores, the axes of which are substantially parallel to the front edge of the plate and upwardly extending side plates, ground wheels supported for rotation on the side plates, shaft members supported for rotation in the outer ends of the bores and deriving motion from the ground wheels, an intermediate shaft, clutch means connecting the intermediate shaft with the outer shaft members, a reciprocatory cutter bar, means for transmitting motion to the cutter bar from the intermediate shaft, and a cap plate mounted on the supporting members and extending across the base plate, said cap plate constituting a cover for the parts of the device mounted on the base plate and also forming a guide over which the cut grass will be discharged.

6. In a lawn mower, a base plate, supporting members mounted thereon, ground wheels mounted on the supporting members, a reciprocatory cutter bar mounted on the base plate, means for transmitting motion from the ground wheels to the reciprocatory cutter bar, and a cap plate, the latter being curved approximately to the shape of a plow mold board extending entirely across the base plate and discharging in rear at one side of the machine.

In testimony whereof I affix my signature in presence of two witnesses.

ANDREW HAUGLAND.

Witnesses:
 NILS LUND,
 CLAIRE HANSEN.